United States Patent
Coffman et al.

(10) Patent No.: US 7,771,593 B2
(45) Date of Patent: Aug. 10, 2010

(54) DEBRIS REMOVAL DEVICE

(76) Inventors: Howard Coffman, 467 NW. 5th St., Earlham, IA (US) 50072; Daniel W. Cunningham, 102 Adams, Grand River, IA (US) 50108

( * ) Notice: Subject to any disclaimer, the term of this patent is extended or adjusted under 35 U.S.C. 154(b) by 14 days.

(21) Appl. No.: 12/173,231

(22) Filed: Jul. 15, 2008

(65) Prior Publication Data

US 2010/0012563 A1 Jan. 21, 2010

(51) Int. Cl.
*A01D 44/00* (2006.01)
*A01D 7/06* (2006.01)

(52) U.S. Cl. .............. 210/170.09; 210/242.1; 47/59 R; 56/8; 56/400.11; 56/400.16

(58) Field of Classification Search .......... 210/167.1, 210/167.19, 170.04, 170.05, 170.09, 170.1, 210/170.11, 242.1, 470; 4/490, 496; 37/316; 47/59 R, 1.4, 1.43; 56/8, 400.01, 400.04, 56/400.11, 400.16; 294/55
See application file for complete search history.

(56) References Cited

U.S. PATENT DOCUMENTS

| | | | |
|---|---|---|---|
| 895,847 A * | 8/1908 | Ditchfield | 56/400.16 |
| 1,054,410 A * | 2/1913 | Henness | 37/316 |
| 1,191,911 A * | 7/1916 | Ritchie | 56/400.16 |
| 2,065,830 A * | 12/1936 | Sherman | 56/400.11 |
| 2,961,817 A * | 11/1960 | Mitchell | 56/8 |
| 3,863,237 A * | 1/1975 | Doerr | 210/170.09 |
| 4,190,279 A * | 2/1980 | Sguazzin | 37/316 |
| 4,774,804 A * | 10/1988 | Sands | 56/8 |
| 4,828,690 A * | 5/1989 | Montez | 37/316 |
| 5,142,855 A * | 9/1992 | Guidarelli | 56/400.16 |
| 5,450,713 A * | 9/1995 | Rohde et al. | 56/8 |
| 5,656,174 A | 8/1997 | Hodges et al. | |
| 5,918,920 A * | 7/1999 | Tamburro, Sr. | 56/400.11 |
| 6,041,738 A | 3/2000 | Hemauer et al. | |
| 6,149,811 A | 11/2000 | Hodges et al. | |
| 6,250,054 B1 * | 6/2001 | Kramer | 56/8 |
| 6,337,025 B1 | 1/2002 | Clemenson | |
| 6,652,743 B2 | 11/2003 | Wallace et al. | |
| 6,748,728 B2 * | 6/2004 | Hay | 56/8 |
| 6,848,247 B2 * | 2/2005 | Rozen et al. | 56/400.16 |
| 6,875,361 B2 | 4/2005 | Park | |
| 7,275,644 B2 | 10/2007 | Ness et al. | |
| 2003/0136096 A1* | 7/2003 | Kretsch | 56/8 |
| 2009/0193776 A1* | 8/2009 | Grosjean | 56/8 |

* cited by examiner

*Primary Examiner*—Christopher Upton

(57) ABSTRACT

A moss and debris removal device having an elongated member with a top edge and a bottom edge wherein the top edge and bottom edge have teeth. A line is mounted to the elongated member. The elongated member has a plurality of holes. In one embodiment, the teeth of the top edge and bottom edge of the elongated member have a V-shaped cross section.

10 Claims, 3 Drawing Sheets

DEBRIS REMOVAL DEVICE

BACKGROUND OF THE INVENTION

This invention relates to a debris removal device for removing debris from the surface of a body of water. More specifically, and without limitation, this invention relates to a moss and debris member for removing moss, algae, trash, or unwanted debris in general from the surface of a pond or lake.

During the spring, summer, and fall months activities such as fishing, boating, and swimming in lakes and ponds are popular forms of recreation. However, the enjoyment of a farm pond or lake is greatly diminished by the presence of filamentous algae, also called "moss" or "pond scum," which can be described as a green, fibrous mat suspended on the top surface of a pond or lake. While a certain amount of algae within a pond is healthy for the ecosystem (usually about 15 percent surface coverage), all too often the algae overpopulates and covers the entire surface of the body of water. Such a proliferation of algae not only is unpleasant for those wishing to fish, swim, or boat in the particular pond or lake, but also can cause oxygen depletion within the body of water which can lead to fish kill. Efforts have been made to control algae within lakes and ponds by introducing certain species of fish which feed on the algae, but the behavior and ability of the fish to control the moss have proven to be unpredictable. Other attempts have been made to control algae by introducing chemicals into the body of water. However, often such chemicals can have an adverse impact on the ecosystem. In addition, attempts to control algae consist of nothing more than using a rake to collect algae from the top of the water, but such a method is ineffective for removing algae beyond the reach of the rake handle.

It is therefore a principal object of this invention to provide a simple, easy to use member for removing algae or other debris from a lake or pond.

A further object of this invention is to provide individuals with an algae-removal device that is chemical free and will not damage the ecosystem.

Yet another object of this invention to provide a versatile member that has the ability to remove algae from distances far beyond the shoreline, either by casting or being pulled behind a boat.

These and other objects, features, or advantages of the present invention will become apparent from the specification and claims.

BRIEF SUMMARY OF THE INVENTION

A moss and debris removal device having an elongated member with a top edge and a bottom edge wherein the top edge and bottom edge have teeth. A line is mounted to the elongated member. Additionally, the elongated member has a plurality of holes. In one embodiment, the teeth of the top edge and bottom edge of the elongated member have a V-shaped cross section.

DETAILED DESCRIPTION OF THE PREFERRED EMBODIMENT

Figure 1:
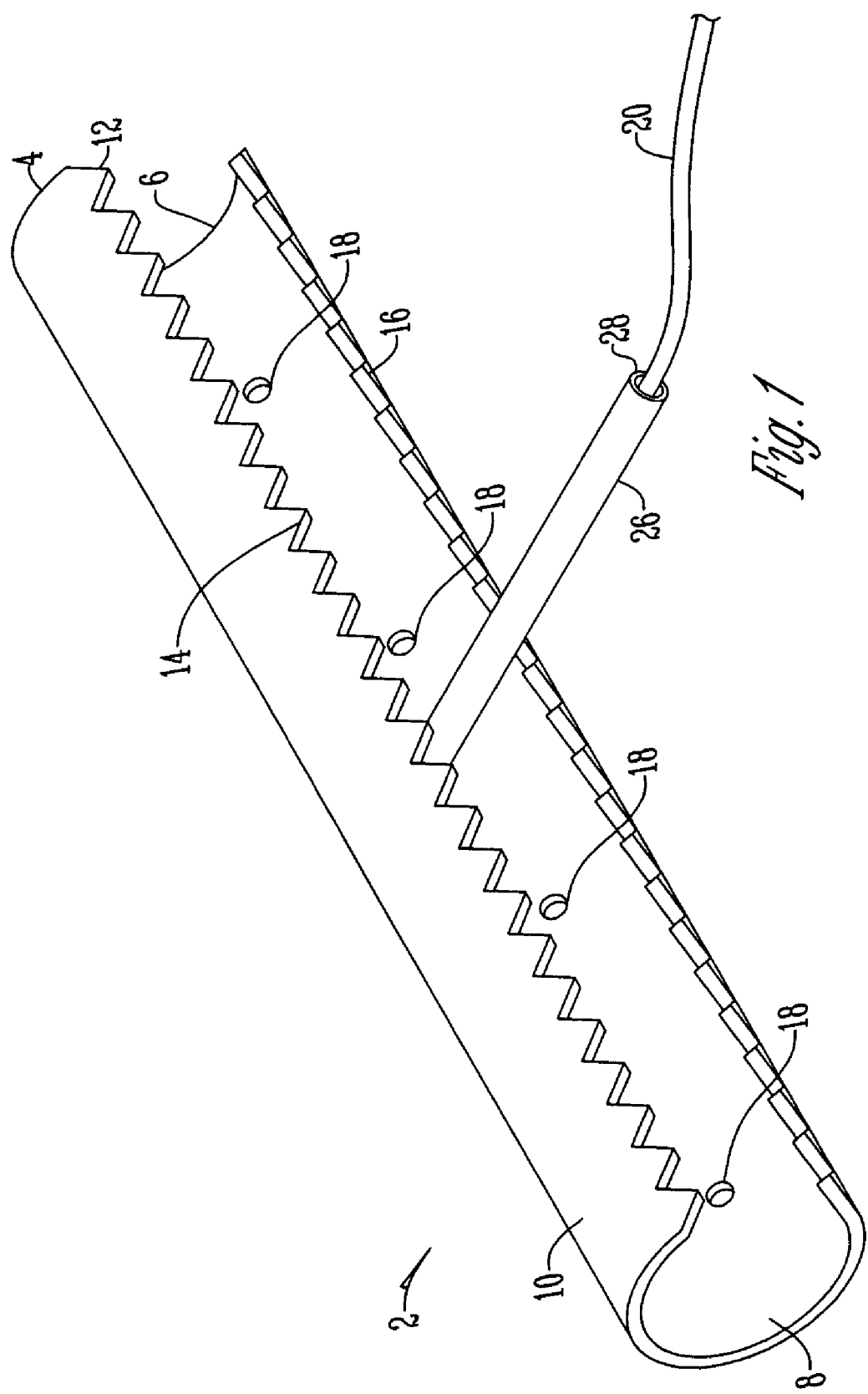
FIG. 1 is a perspective view of the present invention.
Figure 2:
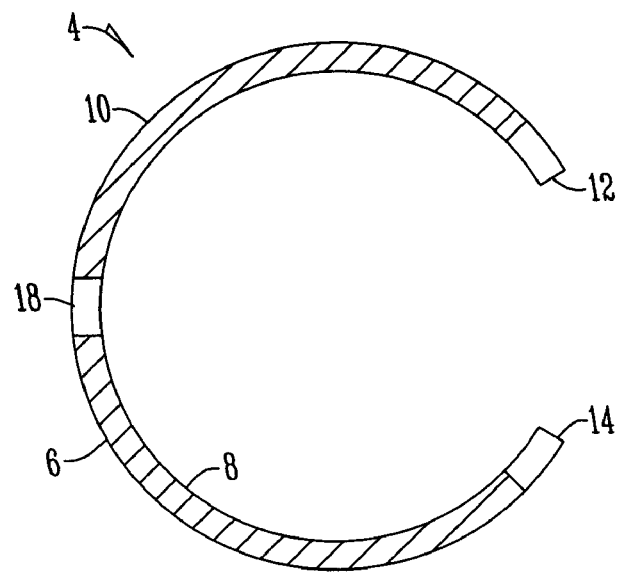
FIG. 2 is a top view of the present invention.
Figure 3:
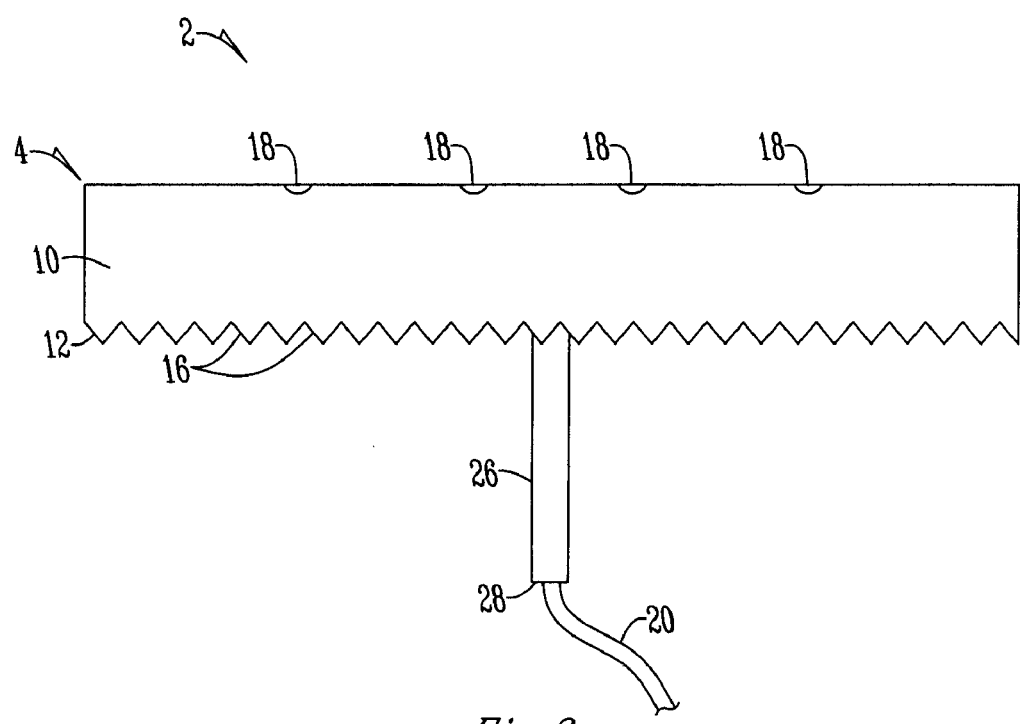
FIG. 3 is a cross-sectional view of the side of the present invention.
Figure 4:
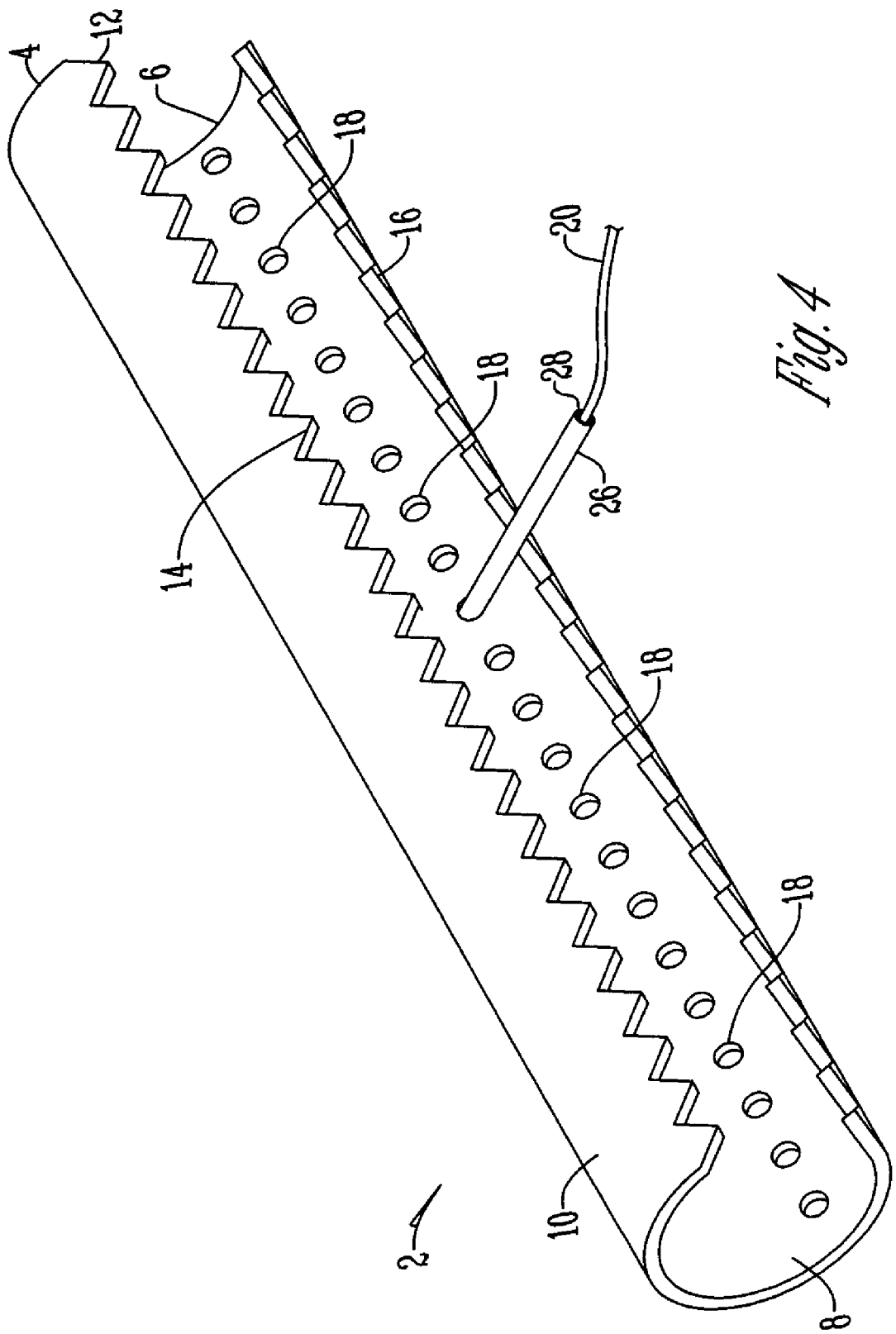
FIG. 4 is a perspective view of an alternative debris removal device.

With reference to the drawings, a moss and debris removal device 2 is disclosed for removing debris from the surface of a body of water. The device has an elongated member 4 with a body 6, which in a preferred embodiment is the shape of a cylindrical beam or pipe cut in half lengthwise with open ends. The length of the body 6 can vary, both by altering the section of material from which the body is fashioned from, and by fastening multiple sections of the body 6 together by any conventional fastening means. The width of the body 6 can also vary, as the body 6 can be made from pipe having either a four or six inch diameter. In an exemplary embodiment, a body 6 segment fashioned from a four inch pipe is fastened to the interior of a body 6 segment having a six inch diameter, thereby providing the body member 6 with an added level of stability. The body 6 can be made of any material that floats on the surface of a body of water. The body 6 can also be painted to provide an attractive aesthetic appearance.

An inner surface 8 which is substantially concave represents the interior surface of the body 6, running its entire length. The body 6 also has an outer surface 10, which in a preferred embodiment is convex. At the top of the elongated member's 4 body 6 the inner surface 8 and outer surface 10 meet to form a top edge 12. Similarly, a bottom edge 14 is formed where the inner surface 8 and outer surface 10 meet at the bottom of the elongated member's 4 body 6. The top edge 12 and bottom edge 14 of the elongated member 4 have a series of teeth 16. In a preferred embodiment, the teeth have a jagged, V-shaped cross section to resemble shark's teeth.

The moss and debris removal device 2 also includes a plurality of holes 18 drilled through the body 6 of the elongated member 4, which allow water to pass through the body 6 of the elongated member 4 as moss or debris is being skimmed from the surface of a body of water. The more holes 18 drilled through the body 6 of the elongated member 4, the more water will flow through the elongated member 4.

In addition, the moss and debris removal device 2 has a line 20 mounted to the body 6. The line 20 allows the elongated member 4 to be cast, thrown, or swung from the shoreline out to the interior of a body of water to remove distant sections of moss or debris. The line 20 also allows the elongated member 4 to remove debris while being pulled behind a boat. In an exemplary embodiment, the line 20 is comprised of two sections of rope 22, each individual section mounted to the inner surface 8 of the body 6 through holes or slots 24 positioned at opposite ends of the elongated body 6. The length of the line 20 can vary depending on the application for which the removal device 2 is being used.

In an alternative embodiment, a handle 26 is attached to the body 6. In a preferred embodiment this handle 26 is made for a single hollow pipe 28 which is made of the same material as the body 6 and is molded in the body 6. The single hollow pipe 28 is preferably 8 inches long. The handle 26 is attached to the center of the body 6 and a line 20 is fed through the single hollow pipe 28 so as to allow an operator to toss and retrieve the debris removal device 2.

Alternatively the handle 26 is made of any material known to one of ordinary skill in the art and the handle 26 is attached to the body 6 by any means known to one of ordinary skill in the art.

In operation, an individual wishing to remove moss or debris from a body of water casts the elongated member 4 into a body of water occupied by moss by using the line 20, as described above. Once in the pond or lake, the elongated member 4 is pulled through the water with the line 20, allowing moss, debris, or trash to collect within the concave inner surface 8 of the body 6. The teeth 16 of the top and bottom edges 12, 14 of the body 6 catch any excess debris which either may be situated above or below the surface of the water. In addition, the teeth 16 trap material attempting to escape once moss begins to accumulate within the concave inner surface 8. The plurality of holes 18 allow water to pass through the elongated member 4 while the body 6 retains whatever moss, algae, trash, or unwanted debris in general is being removed from the surface of a pond or lake in a quick, easy, and ecologically friendly manner. Thus, at the very least all of the objectives have been met.

It will be appreciated by those skilled in the art that other various modifications could be made to the device without the parting from the spirit in scope of this invention. All such modifications and changes fall within the scope of the claims and are intended to be covered thereby.

What is claimed is:

1. A moss and debris removal device comprising:
   an elongated member having a top edge and a bottom edge wherein the top edge and bottom edge have teeth,
   a line mounted to the elongated member; and
   wherein the elongated member is a substantially solid surface having a plurality of holes that allow water to pass through the elongated member.

2. The moss and debris removal device of claim 1 wherein the teeth have a V-shaped cross section.

3. The moss and debris removal device of claim 1 wherein the elongated member has an inner surface which is concave.

4. The moss and debris removal device of claim 1 wherein the elongated member has an outer surface which is convex.

5. The moss and debris removal device of claim 1 wherein a handle is mounted to the elongated member.

6. The moss and debris removal device of claim 5 wherein the handle is a single hollow pipe.

7. The moss and debris removal device of claim 5 wherein the handle is molded in the elongated member.

8. The moss and debris removal device of claim 5 wherein the handle is made of the same material as the elongated member.

9. The moss and debris removal device of claim 1 wherein the top edge is formed where an inner surface that is concave meets an outer surface that is convex.

10. The moss and debris removal device of claim 9 wherein the bottom edge is formed where the inner surface meets the outer surface.

* * * * *